3,269,967
WATER EMULSION ALKYD RESIN COMPOSITION COMPRISING WATER SOLUBLE ALKANOL-AMINE AND POLYETHENOXY ETHER OF ALKYLPHENOL
Ronald L. Broadhead, Park Forest, Ill., assignor to Standard Oil Company, Chicago, Ill., a corporation of Indiana
No Drawing. Filed May 27, 1960, Ser. No. 32,127
8 Claims. (Cl. 260—22)

This invention relates to surface coating compositions wherein the film-former resin is an oil-modified alkyd resin and the resin is dispersed in a water vehicle in the form of an emulsion type paint.

Water emulsion type alkyd resin surface coating compositions have been known for many years. However, their drawbacks have resulted in their virtual displacement from the commercial market by the rubber latex compositions. These alkyd resin water emulsions required high levels of emulsifiers to obtain a reasonable degree of storage stability. With many alkyd resins these high levels of emulsifiers had an adverse effect on the quality of the surface coating laid down by the composition. Even in high levels of emulsifier content these previously known alkyd resin water emulsion compositions had relatively short storage life, in the can, and also were not readily redispersed after settling out during storage.

The advantages of utilizing water as the vehicle for a surface coating composition with respect to ease of dilution, safety, and ease of cleaning of the application equipment are considerable. The alkyd resin films possess properties distinct from and advantageous over the so-called latex paints for many applications, particularly outdoor work.

It has been discovered that long oil alkyd resins can be used to make water emulsion type compositions of excellent storage stability, in the can, by the use of a combination of emulsifying agents. The necessary "oil-in-water" emulsion of satisfactory storage stability is obtainable only by using this combination of these particular emulsifying agents. The emulsifying agents are certain hereinafter defined alkanol-amines and certain hereinafter defined polyethenoxy ethers of alkylphenol. These compositions not only have excellent emulsion stability but permit very ready redispersion of pigments and other solids normally present in paints into the vehicle. Prolonged storage does not change the flow characteristics of the emulsion nor the drying rate of the films nor the quality of the films.

In the instant composition an oil-modified alkyd resin is emulsified in water. These resins are the polyesterification condensation reaction products of polyhydric alcohols, unsaturated fatty acid, and benzene polycarboxylic acid containing 2, 3, or 4 carboxyl groups; the resin having an acid number of not more than about 20.

The polyhydric alcohol may be any one of the alcohols which contain at least two hydroxyl groups. Examples of typical polyhydric alcohols which have been used in the preparation of alkyd resins and may be used herein are glycerol, trimethylol propane, pentaerythritol, dipentaerythritol, sorbitol and mannitol. In addition to these polyhydric alcohols, diols may be used, such as ethylene glycol, propylene glycol, diethylene glycol, dipropylene glycol, tetraethylene glycol, etc.

The unsaturated fatty acid includes the fatty oils (drying oils) commonly used in alkyd resin preparation. The fatty acid contains at least two olefinic bonds and at least about 10 carbon atoms. The fatty acids containing 16–24 carbon atoms are particularly suitable. Illustrative fatty acids are: linoleic hiragonic, eleostearic, moroctic, arachidonic, clupanodonic, and nisinic. Economical and preferred sources of acids are the natural mixtures of acids obtained from drying (fatty) oils such as linseed oil, soya oil, tung oil, etc. Any of the drying oils containing fatty acid esters, whether of vegetable or marine life origin, may be utilized. Illustrative of these drying oils are: linseed, soybean, tung, castor, dehydrated castor, oiticica, perilla, safflower, menhaden, and sardine.

The benzene polycarboxylic acid includes not only those having a single phenyl nucleus but also those having a diphenyl nucleus and also those having another group positioned between the two phenyl groups in the diphenyl nucleus.

The benzene dicarboxylic acid may be one of the unsubstituted acids, i.e., phthalic acid, phthalic anhydride, isophthalic acid and terephthalic acid. Or alkyl substituted acid where the alkyl contains 1–8 carbon atoms, such as t-butylisophthalic acid, isooctylphthalic acid, dimethylterephthalic acid, methylphthalic anhydride. Or a halo substituted acid, such as, chlorophthalic acid, dichloroterephthalic acid, bromophthalic anhydride, and iodoisophthalic acid. Or diphenyldicarboxylic acid, benzophenone dicarboxylic acid, etc.

When using a benzene dicarboxylic acid, the oil-length of the resin product is adjusted to be at least about 50%; this in order to obtain good storage life of the emulsion composition.

The tricarboxylic acid present may be trimellitic acid, trimellitic anhydride, hemimellitic acid, hemimellitic anhydride, trimesic acid, benzophenone tricarboxylic acid, diphenyltricarboxylic acid, etc.

The benzene tetracarboxylic acid may be pyromellitic acid, pyromellitic dianhydride, a diphenyltetracarboxylic acid (anhydride), diphenylmethane tetracarboxylic acid (anhydride), benzophenone tetracarboxylic acid (anhydride), diphenylsulfone tetracarboxylic acid (anhydride), etc.

When the benzene polycarboxylic acid contains 3–4 carboxyl groups, the oil-length of the resin product is adjusted to be at least about 70% in order to get good storage life of the emulsion composition.

The polyesterification-condensation reaction is continued until the acid number (mg. KOH/g. of resin) is not more than about 20. Usually the acid numbers run from about 3 to about 10.

It is to be understood that the above enumeration of illustrative reactants is not exhaustive. The composition includes the variations of resin reactants well-known to the workers in the surface coating art.

The polyesterification-condensation reaction is carried out in the usual manner. Usually it is carried out in a vessel provided with a condensing system permitting trapping out of water of reaction. The reactants are agitated at a temperature of about 150° C. to about 225° C., more usually about 180–200° C. The reaction is continued until the desired acid number is reached or to the point where the viscosity increase of the contents of the reaction zone indicate that the gelation point is being approached.

Numerous illustrations of commonly used phthalic acids are set out in Organic Coating Technology, volume 1 (1954), by H. F. Payne. Chapters 7 and 8 are directed to alkyd resins and their various modifications. Illustrations of oil-modified alkyd resins from trimellitic anhydride are U.S. Patents Nos. 2,856,374 and 2,860,113.

Sufficient water is present in the composition so that the resin content is not more than about 45 weight percent based on water plus resin present. More usually the resin content will be about 15–40 weight percent.

Preferably the alkanolamine is dissolved in the water before the water and the resin are intermingled. The alkanolamine used herein is of the type $R_2NC_nH_{2n}OH$ where R is either hydrogen, methyl or ethyl and $n$ is an integer equal to 2, 3 or 4. The aminopropanols are particularly suitable. Illustrative are monoethanolamine, 3-amino-1-propanol, 2 - amino - 1 - propanol, 3-(dimethylamino)-1-propanol, and 2-amino-2-methyl-1-propanol.

The alkanolamine is introduced in about the amount needed to neutralize the acidity of the resin introduced. It is preferred that at least the neutralization amount be used.

The storage stable emulsion composition is obtained by the use of an oil-soluble (i.e., soluble in the resin) polyethenoxy ether of alkylphenol (alkaryether of polyethylene glycol). The alkyl constituent contains 4–12 carbon atoms, such as, t-butyl, amyl, isooctyl, diisobutyl, nonyl, decyl and dodecyl. Two-ten ethenoxy groups are present in the ether. Particularly suitable are those containing 2–5 ethenoxy groups and the alkyl contains 4–9 carbon atoms.

While usually the ether is prepared by condensing an alkyl phenol and ethylene oxide, the ethenoxy groups may be provided by reaction which involved a polyethylene glycol. Also, it is to be understood that the number of ethenoxy groups is an "average" as used in the terminology of the surfactant art.

The ether is introduced into the composition in an amount of about 1–5 weight percent, based on resin. Usually the usage falls in the range of about 2–3%. The exact amount used is dependent on the type and amount of resin used in forming the composition.

The water emulsion type composition is preferably prepared by dissolving the alkanolamine into the water at a temperature on the order of 50–80° C. Dissolving the defined ether into the defined alkyd resin at a temperature wherein ready solution is obtained, which temperature is usually about the same temperature as the hot water. The resin-ether solution is then added at a suitable rate to the agitated water-alkanolamine solution at a temperature on the order of 50–80° C. The emulsion is found to form rapidly and does not need any special type of stirring. The propeller or turbine type impellers are entirely suitable. When driers (siccatives) are utilized, it is preferred to add these to the resin because normally these materials are primarily oil soluble. When a water soluble drier is available it is preferred to add this to the water prior to the addition of the resin-ether solution.

After the formation of the emulsion, pigments, extenders, dyes, and other normal paint components may be introduced into the emulsion by techniques presently utilized in the surface coating industry. Some of these procedures are illustrated in the working examples which follow hereinafter.

ILLUSTRATIONS

Three compositions falling within the scope of the invention are set out hereinbelow. Two of these compositions were prepared with commercially available long oil, phthalic anhydride, alkyd resins. One composition was prepared utilizing a trimellitic anhydride resin.

Example 1

30.0 grams of a long oil phthalic-soya alkyd resin having an acid number of 8.2 and a viscosity of Z–2 to Z–3 (Gardner scale) were heated together with 1.0 gram of an alkyl-phenyl polyethylene glycol (trade name Tergitol NP–14 which is a nonyl phenol polyethylene glycol ether containing 4 mols of ethylene oxide) to 70° C. This solution was poured with rapid mechanical stirring into a solution of 1.0 gram of 2-amino-2-methyl-1-propanol in 68 ml. distilled water also at 70° C. Immediate emulsification resulted. After the mixture was stirred for 10 minutes, 1.0 ml. lead naphthenate solution (containing 24% lead) and 0.50 ml. cobalt naphthenate solution (containing 6% cobalt) were added followed by 10.0 grams of titanium dioxide. This paint was still stable after 29 months storage. Stirring is required before application to redisperse the pigment. Drying properties of the paint is good, i.e., tack-free in 2–3 hours and thorough-dry overnight.

Example 2

18.50 grams rutile titanium dioxide, 18.50 grams titanium dioxide (both from Du Pont) and 39.50 grams 3X talc were pebble-milled together with 123.5 grams of water for 22 hours. 3.0 grams of 2-amino-2-methyl-1-propanol and 5.0 grams bentonite were added and milled into the charge for 5 minutes. Then a mixture of 2.0 grams, Tergitol NP–14, 70.0 grams of long oil alkyd and 0.5 gram of cobalt naphthenate was added with mechanical stirring to the ball mill. Stirring was continued for 15 minutes and the charge was thinned with 50 ml. distilled water to brushing consistency. This is an exterior type pigmentation. The example shows that blends of pigment can be used to give stable emulsion paint. This paint was still stable after 26 months' storage.

Example 3

36.0 grams of a long oil alkyd prepared from trimellitic anhydride (83% oil length, acid number=8.2) 1.0 gram 2 - amino - 2 - methyl - 1 - propanol and 1.0 gram Tergitol NP–14 were heated together at 70° C. 168 ml. distilled water also at 70° C. were added slowly until the inversion point (about 50 ml. of water were required) and then the remainder of the water was added with vigorous mechanical stirring followed by 0.25 gram cobalt naphthenate solution containing 6% cobalt. This emulsion was still stable after 29 months.

Thus having described the invention, what is claimed is:

1. A water-emulsion-type, alkyd resin surface coating composition which emulsion consists essentially of (a) water vehicle, (b) oil-modified alkyd resin, in an amount of not more than 45 weight percent based on water plus resin present, which resin is the polyesterification-condensation reaction product of polyhydric alcohol, unsaturated fatty acid having at least ten carbon atoms and at least two olefinic bonds and benzene polycarboxylic acid containing 2–4 carboxyl groups, said resin having an acid number of not more than about 20, and wherein resins derived from benzene dicarboxylic acid have an oil-length of at least about 50% and resins derived from said other polycarboxylic acids having more than two carboxyl groups have an oil-length of at least about 70%, (c) water soluble alkanolamine of the type $R_2NC_nH_{2n}OH$ where $n$ is an integer equal to 2–4 and R is selected from the class consisting of hydrogen, methyl and ethyl, said alkanolamine being present in about the amount needed to neutralize the acidity of said resin, and (d) polyethenoxy ether of alkylphenol wherein alkyl contains 4–12 carbon atoms and 2–10 ethenoxy groups are present, said ether being present in an amount of about 1–5 weight percent, based on said resin, said alkanolamine and said ether acting as emulsifying agents for said resin, whereby a storage stable water-emulsion-type surface coating composition is formed.

2. The composition of claim 1 wherein said alkanolamine is 2-amino-2-methyl-1-propanol.

3. The composition of claim 1 wherein said ether alkyl contains 8 carbon atoms and 3 ethenoxy groups are present.

4. The composition of claim 1 wherein said acid is phthalic anhydride.

5. The composition of claim 1 wherein said acid is trimellitic anhydride.

6. The composition of claim 1 wherein said ether is present in an amount of about 2–3 weight percent.

7. The composition of claim 1 wherein a drier is present.

8. The composition of claim 1 wherein said resin amount is about 15–40 weight percent.

(References on following page)

References Cited by the Examiner

UNITED STATES PATENTS

| | | | |
|---|---|---|---|
| 2,563,871 | 8/1951 | Rust et al. | 260—22 |
| 2,568,747 | 9/1951 | Kirkpatrick et al. | 260—22 |
| 3,023,177 | 2/1962 | Boucher | 260—21 |
| 3,027,341 | 3/1962 | Boucher et al. | 260—22 |

FOREIGN PATENTS

| | | |
|---|---|---|
| 378,596 | 8/1932 | Great Britain. |

OTHER REFERENCES

"Official Digest" (Gardner) May 1953, pp. 266–280 relied on.

LEON J. BERCOVITZ, *Primary Examiner.*

ALPHONSO D. SULLIVAN, MILTON STERMAN, *Examiners.*

H. LEVINE, J. W. BEHRINGER, R. W. GRIFFIN, *Assistant Examiners.*